United States Patent
Funahashi

(10) Patent No.: US 6,738,531 B1
(45) Date of Patent: May 18, 2004

(54) IMAGE PROCESSING METHOD AND APPARATUS

(75) Inventor: Takeshi Funahashi, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/568,161

(22) Filed: May 10, 2000

(30) Foreign Application Priority Data

May 10, 1999 (JP) .......................................... 11/127963

(51) Int. Cl.⁷ ................................................. G06K 9/32
(52) U.S. Cl. ........................ 382/294; 382/295; 382/298
(58) Field of Search ................................ 382/294, 295, 382/296, 297, 298, 131, 132, 151, 201; 378/163, 182, 62, 162; 600/429; 606/130; 358/451; 250/584

(56) References Cited

U.S. PATENT DOCUMENTS

| | | | | |
|---|---|---|---|---|
| 4,710,875 A | * | 12/1987 | Nakajima et al. | 378/162 |
| 5,070,454 A | * | 12/1991 | Griffith | 378/163 |
| 5,123,040 A | * | 6/1992 | Fabian | 378/182 |
| 5,345,938 A | * | 9/1994 | Nishiki et al. | 600/463 |
| 5,363,211 A | * | 11/1994 | Hasebe et al. | 358/451 |
| 5,623,560 A | * | 4/1997 | Nakajima et al. | 382/295 |
| 5,807,256 A | * | 9/1998 | Taguchi et al. | 600/425 |
| 5,841,148 A | * | 11/1998 | Some et al. | 250/584 |
| 6,118,845 A | * | 9/2000 | Simon et al. | 378/62 |
| 6,419,680 B1 | * | 7/2002 | Cosman et al. | 606/130 |
| 6,490,477 B1 | * | 12/2002 | Zylka et al. | 600/429 |

* cited by examiner

Primary Examiner—Mehrdad Dastouri
(74) Attorney, Agent, or Firm—Sughrue Mion, PLLC

(57) ABSTRACT

In an image processing method, a direction transforming process is performed on an image signal representing an image and in accordance with information giving specifics about an image recording technique. In cases where a marker pattern, which is represented by a marker signal, is to be appended to the image represented by the image signal, the direction and the appending position of the marker signal are determined in accordance with the information giving specifics about the image recording technique. The marker signal is appended to the image signal in accordance with the thus determined direction and the thus determined appending position of the marker signal. The marker signal is thus appended to the image signal in an appropriate state in accordance with the specifics about the image recording technique.

6 Claims, 16 Drawing Sheets

IMAGE PROCESSING METHOD AND APPARATUS

BACKGROUND OF THE INVENTION

1. Field of the Invention

This invention relates to an image processing method and apparatus, in which a direction transforming process for reversing and/or rotating an image signal representing an image of an object is performed in accordance with information giving specifics about an image recording technique, such as the direction from which the image of the object, e.g. a patient, is recorded, and the orientation of the object in the image recording operation. This invention also relates to a recording medium, on which a program for causing a computer to execute the image processing method has been recorded and from which the computer is capable of reading the program.

2. Description of the Prior Art

It has been proposed by the applicant to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then subjected to image processing, such as gradation processing, and the thus obtained processed image signal is used for the reproduction of the radiation image of the object as a visible image on a recording material.

In the radiation image recording and reproducing systems described above, the operation for recording a radiation image of an object is performed with one of various image recording techniques. For example, in cases where a radiation image of the chest of a patient is to be recorded, radiation may be irradiated to the patient from the back side of the patient or from the abdomen side of the patient. Also, in the image recording operation, the patient may stand facing the stimulable phosphor sheet or may stand facing the side opposite to the stimulable phosphor sheet. The image signal having been obtained by reading out the recorded radiation image is subjected to a process for reversing or rotating the radiation image in accordance with the image recording technique, which was employed in the image recording operation, and the image signal having been obtained from the process is utilized for reproducing the radiation image as a visible image. By way of example, in cases where the image recording operation is performed, in which the patient stands facing the stimulable phosphor sheet and radiation is irradiated to the patient from the back side of the patient, the radiation image shown in FIG. 2A is obtained, in which a pattern of the heart is embedded on the left side when the radiation image is seen from the direction of irradiation of the radiation. However, when the radiation image is to be used for making a diagnosis of an illness, it is necessary that the heart pattern is located on the right side as the person, who sees the image, stands facing the image. Therefore, in such cases, as illustrated in FIG. 2B, a process for reversing the right and left sides of the image represented by the original image signal is performed on the original image signal, and a reversed image signal is thereby obtained. The reversed image signal is then utilized for reproducing a visible image. In this manner, a reproduced image, in which the heart pattern is located on the right side as the person, who sees the image, stands facing the image, can be obtained.

An operation for recording a radiation image of an object is often performed by the utilization of a marker for representing the direction from which the image of the object is recorded, the orientation of the object, e.g. a patient, in the image recording operation, or the like. The marker utilized in the image recording operation is formed from a metal, such as lead, which does not transmit radiation. For example, in cases where a radiation image of the chest of a human body is to be obtained, an L-shaped marker may be attached to an upper left corner area of the stimulable phosphor sheet, and the image pattern of the marker may be recorded together with the object image on the stimulable phosphor sheet. In such cases, the radiation image shown in FIG. 3A is obtained, in which the L-shaped marker pattern is embedded at the upper left corner area when the radiation image is seen from the direction of irradiation of the radiation. When the radiation image shown in FIG. 3A is reproduced as a visible image, the right and left sides of the image represented by the original image signal are reversed, and the image shown in FIG. 3B is obtained. In such cases, when a person sees the reproduced image, since the L-shaped marker pattern has been reversed, the person can easily recognize that the right and left sides of the image have been reversed.

Instead of the marker pattern being recorded together with the object image, it may be considered to append a digital marker signal representing the marker pattern to the image signal representing the radiation image. In cases where the marker signal is thus appended to the image signal, a radiation image can be obtained, in which the marker pattern has been appended to a desired position. Also, a marker pattern having an arbitrary shape can be embedded in the radiation image.

However, as described above, the image signal, to which the marker signal is to be appended, is often subjected to the direction transforming process through reversion or rotation in accordance with the information giving specifics about the image recording technique. Therefore, if the marker signal is directly appended to the image signal, which has been obtained from the direction transforming process, the problems described below will occur. Specifically, the problems will occur in that, for example, as illustrated in FIG. 19, in cases where the marker signal is the one representing the L-shaped marker pattern, the image represented by the image signal has been transformed in direction, but the L-shaped marker pattern is appended to the image in the form having not been transformed in direction. Therefore, the person, who sees the radiation image, will misunderstand that the radiation image is the one having not been transformed in direction, and there is the risk that an incorrect diagnosis, or the like, will be made.

SUMMARY OF THE INVENTION

The primary object of the present invention is to provide an image processing method, wherein a marker signal is capable of being appended to an image signal in an appropriate state in accordance with specifics about an image recording technique.

Another object of the present invention is to provide an apparatus for carrying out the image processing method.

A further object of the present invention is to provide a recording medium, on which a program for causing a computer to execute the image processing method has been recorded and from which the computer is capable of reading the program.

The present invention provides a first image processing method, in which a direction transforming process is performed on an image signal representing an image and in accordance with information giving specifics about an image recording technique, and in which a marker pattern represented by a marker signal is appended to the image represented by the image signal, the method comprising the steps of:

i) determining a direction of the marker signal and an appending position of the marker signal in accordance with the information giving specifics about the image recording technique, and ii) appending the marker signal to the image signal in accordance with the thus determined direction of the marker signal and the thus determined appending position of the marker signal.

The term "specifics about an image recording technique" as used herein means the direction of incidence of radiation in the image recording operation, the orientation (positioning) of an object, such as a patient, the orientation of a stimulable phosphor sheet for storing a radiation image, and the like.

The term "direction transforming process" as used herein means the process for reversing and/or rotating the image signal, such that an image seen from a desired direction can be obtained when the image is reproduced from the image signal having been obtained from the process. The term "rotation" as used herein means the operation for rotating the image, which is represented by the image signal, by a desired angle around, for example, the center of gravity on the image. The term "reversion" as used herein means the operation for reversing the image, which is represented by the image signal, symmetrically with respect to, for example, a certain axis.

In the first image processing method in accordance with the present invention, the direction of the marker signal and the appending position of the marker signal are determined in accordance with the information giving specifics about the image recording technique. Specifically, the direction of the marker signal and the appending position of the marker signal are determined such that the direction and the appending position of a marker pattern embedded in a radiation image, which has been obtained by performing an image recording operation by use of a marker and which has then been subjected to a direction transforming process, and the direction and the appending position of the marker pattern embedded in the radiation image, which has been reproduced from the image signal (after being subjected to the direction transforming process) that is appended with the marker signal, may coincide with each other.

The term "appending a marker signal to an image signal" as used herein means the operation for replacing the image signal components of the image signal, which correspond to the position to be appended with the marker pattern, by the marker signal, or the operation for appending the marker signal to the image signal as an overlay signal for the image signal. The image signal, to which the marker signal is to be appended, may be the one after being subjected to the direction transforming process. Alternatively, the image signal, to which the marker signal is to be appended, may be the one before being subjected to the direction transforming process.

The first image processing method in accordance with the present invention should preferably be modified such that a size of the marker signal is altered in accordance with a size of the image, which is represented by the image signal, and/or a read-out density, with which the image signal was obtained.

Also, the first image processing method in accordance with the present invention should preferably be modified such that a marker signal representing a marker pattern having a size adapting to a size of the image, which is represented by the image signal, and/or a read-out density, with which the image signal was obtained, is selected from a plurality of marker signals, which represent marker patterns having different sizes and having been prepared previously, and the direction and the appending position of the thus selected marker signal are determined.

Further, the first image processing method in accordance with the present invention should preferably be modified such that, in cases where the image signal components of the image signal, which correspond to the position in the vicinity of the appending position of the marker signal, take signal values (for example, in the cases of 8 bits, 255 or values close to 255) approximately identical with the signal value of the marker signal, the signal value of the marker signal is altered (such that the marker pattern becomes perceptible), and/or the signal values of the image signal components of the image signal, which image signal components correspond to the position in the vicinity of the appending position of the marker signal, are altered. The marker signal may then be appended to the image signal.

The present invention also provides a second image processing method, in which a direction transforming process is performed on an image signal representing an image and in accordance with information giving specifics about an image recording technique, and in which a marker pattern represented by a marker signal is appended to the image represented by the image signal, the method comprising the steps of:

i) performing the direction transforming process on the image signal, ii) displaying an image, which is represented by the image signal having been subjected to the direction transforming process, together with a pointer, which indicates an arbitrary position on the image, on displaying means, iii) altering the direction of the marker signal in accordance with the information giving specifics about the image recording technique, iv) altering the shape of the pointer to a shape of a marker pattern, which is represented by the altered marker signal, v) altering the position of the marker pattern on the image in accordance with a pointer position altering instruction, and vi) appending the marker signal to the image signal in accordance with a marker pattern appending instruction given at a desired position on the image displayed on the displaying means.

The second image processing method in accordance with the present invention should preferably be modified such that a size of the marker signal is altered in accordance with a size of the image, which is represented by the image signal, and/or a read-out density, with which the image signal was obtained.

Also, the second image processing method in accordance with the present invention should preferably be modified such that a marker signal representing a marker pattern having a size adapting to a size of the image, which is represented by the image signal, and/or a read-out density, with which the image signal was obtained, is selected from a plurality of marker signals, which represent marker patterns having different sizes and having been prepared previously, and the direction of the thus selected marker signal is altered.

Further, as in the aforesaid first image processing method in accordance with the present invention, the second image processing method in accordance with the present invention should preferably be modified such that, in cases where the image signal components of the image signal, which correspond to the position in the vicinity of the appending position of the marker signal, take signal values approximately identical with the signal value of the marker signal, the signal value of the marker signal is altered (such that the marker pattern becomes perceptible), and/or the signal values of the image signal components of the image signal, which image signal components correspond to the position in the vicinity of the appending position of the marker signal, are altered. The marker signal may then be appended to the image signal.

The present invention further provides a first image processing apparatus, which is provided with direction transforming means for performing a direction transforming process on an image signal representing an image and in accordance with information giving specifics about an image recording technique, and in which a marker pattern represented by a marker signal is appended to the image represented by the image signal, the apparatus comprising:

i) determination means for determining a direction of the marker signal and an appending position of the marker signal in accordance with the information giving specifics about the image recording technique, and
  ii) marker signal appending means for appending the marker signal to the image signal in accordance with the thus determined direction of the marker signal and the thus determined appending position of the marker signal.

The first image processing apparatus in accordance with the present invention should preferably be modified such that the determination means alters a size of the marker signal in accordance with a size of the image, which is represented by the image signal, and/or a read-out density, with which the image signal was obtained.

Also, the first image processing apparatus in accordance with the present invention should preferably be modified such that the apparatus further comprises storage means for storing a plurality of marker signals, which represent marker patterns having different sizes and having been prepared previously, and selection means for selecting a marker signal representing a marker pattern having a size adapting to a size of the image, which is represented by the image signal, and/or a read-out density, with which the image signal was obtained, the selection being made from the plurality of the marker signals, which represent the marker patterns having different sizes and have been stored in the storage means, and the determination means determines the direction and the appending position of the thus selected marker signal.

Further, the first image processing apparatus in accordance with the present invention should preferably further comprise signal value altering means for operating such that, in cases where a signal value of the marker signal and signal values of image signal components of the image signal, which image signal components correspond to the position in the vicinity of the appending position of the marker signal, approximately coincide with each other, the signal value altering means alters the signal value of the marker signal and/or the signal values of the image signal components of the image signal, which image signal components correspond to the position in the vicinity of the appending position of the marker signal.

The present invention still further provides a second image processing apparatus, which is provided with direction transforming means for performing a direction transforming process on an image signal representing an image and in accordance with information giving specifics about an image recording technique, the apparatus comprising:

i) displaying means for displaying an image, which is represented by the image signal having been subjected to the direction transforming process performed by the direction transforming means, together with a pointer, which indicates an arbitrary position on the image,
  ii) marker signal altering means for altering a direction of a marker signal, which represents a marker pattern to be appended to the image represented by the image signal, in accordance with the information giving specifics about the image recording technique,
  iii) pointer altering means for altering the shape of the pointer to a shape of a marker pattern, which is represented by the altered marker signal,
  iv) position altering means for altering the position of the marker pattern on the image in accordance with a pointer position altering instruction, and
  v) marker signal appending means for appending the marker signal to the image signal in accordance with a marker pattern appending instruction given at a desired position on the image displayed on the displaying means.

The second image processing apparatus in accordance with the present invention should preferably be modified such that the determination means alters a size of the marker signal in accordance with a size of the image, which is represented by the image signal, and/or a read-out density, with which the image signal was obtained.

Also, the second image processing apparatus in accordance with the present invention should preferably be modified such that the apparatus further comprises storage means for storing a plurality of marker signals, which represent marker patterns having different sizes and having been prepared previously, and selection means for selecting a marker signal representing a marker pattern having a size adapting to a size of the image, which is represented by the image signal, and/or a read-out density, with which the image signal was obtained, the selection being made from the plurality of the marker signals, which represent the marker patterns having different sizes and have been stored in the storage means, and the marker signal altering means alters the direction of the thus selected marker signal.

Further, the second image processing apparatus in accordance with the present invention should preferably further comprise signal value altering means for operating such that, in cases where a signal value of the marker signal and signal values of image signal components of the image signal, which image signal components correspond to the position in the vicinity of the appending position of the marker signal, approximately coincide with each other, the signal value altering means alters the signal value of the marker signal and/or the signal values of the image signal components of the image signal, which image signal components correspond to the position in the vicinity of the appending position of the marker signal.

The present invention also provides a recording medium, on which a program for causing a computer to execute the first image processing method in accordance with the present invention has been recorded and from which the computer is capable of reading the program.

The present invention further provides a recording medium, on which a program for causing a computer to execute the second image processing method in accordance with the present invention has been recorded and from which the computer is capable of reading the program.

With the first image processing method and apparatus in accordance with the present invention, in cases where the marker pattern, which is represented by the marker signal, is to be appended to the image represented by the image signal, the direction of the marker signal and the appending position of the marker signal are determined in accordance with the information giving specifics about the image recording technique. At this time, the direction of the marker signal and the appending position of the marker signal are determined such that the direction and the appending position of a marker pattern embedded in a radiation image, which has been obtained by performing an image recording operation by use of a marker, and the direction and the appending position of the marker pattern embedded in the radiation image having been reproduced from the image signal appended with the marker signal may coincide with each other. Therefore, in accordance with the direction transforming process performed on the image signal, the marker pattern represented by the marker signal can be appended to the image represented by the image signal in the same manner as that in the cases where the image recording operation is performed by use of a marker. Accordingly, the problems can be prevented from occurring in that the person, who sees the radiation image, misunderstands the reversion of the radiation image or the direction of rotation of the radiation image and makes an incorrect diagnosis, or the like.

With the second image processing method and apparatus in accordance with the present invention, the image, which is represented by the image signal having been subjected to the direction transforming process, is displayed on the displaying means. Also, the direction of the marker signal is altered in accordance with the information giving specifics about the image recording technique. Further, the shape of the pointer, which is displayed on the displaying means, is altered to the shape of the marker pattern, which is represented by the direction-altered marker signal. Thereafter, the position of the marker pattern on the image is altered in accordance with the pointer position altering instruction. Further, the marker signal is appended to the image signal in accordance with the marker pattern appending instruction given at a desired position on the image displayed on the displaying means. Therefore, the image in the state in which the marker pattern is appended can be confirmed on the displaying means, and the marker pattern appending position can be determined easily.

With the first image processing method and apparatus in accordance with the present invention and the second image processing method and apparatus in accordance with the present invention, wherein the size of the marker signal is altered in accordance with the size of the image, which is represented by the image signal, and/or the read-out density, with which the image signal was obtained, the marker pattern adapting to the size of the image, which is represented by the image signal, and/or the read-out density, with which the image signal was obtained, can be displayed on the image. Therefore, the marker pattern which is easy to see can be obtained.

With the first image processing method and apparatus in accordance with the present invention and the second image processing method and apparatus in accordance with the present invention, the marker signal representing the marker pattern having the size adapting to the size of the image, which is represented by the image signal, and/or the read-out density, with which the image signal was obtained, may be selected from a plurality of marker signals, which represent marker patterns having different sizes and having been prepared previously, and the direction and the appending position of the thus selected marker signal may be determined, or the direction of the thus selected marker signal may be altered. In such cases,the marker pattern having the size adapting to the size of the image, which is represented by the image signal, and/or the read-out density, with which the image signal was obtained, can be displayed on the image. Therefore, the marker pattern which is easy to see can be obtained.

With the first image processing method and apparatus in accordance with the present invention and the second image processing method and apparatus in accordance with the present invention, in cases where the signal value of the marker signal and the signal values of image signal components of the image signal, which image signal components correspond to the position in the vicinity of the appending position of the marker signal, approximately coincide with each other, the signal value of the marker signal and/or the signal values of the image signal components of the image signal, which image signal components correspond to the position in the vicinity of the appending position of the marker signal, may be altered. In such cases, for example, when a white marker pattern is appended to a white region in the image, the marker pattern can be kept easy to see.

DESCRIPTION OF THE PREFERRED EMBODIMENTS

The present invention will hereinbelow be described in further detail with reference to the accompanying drawings.

Figure 1:
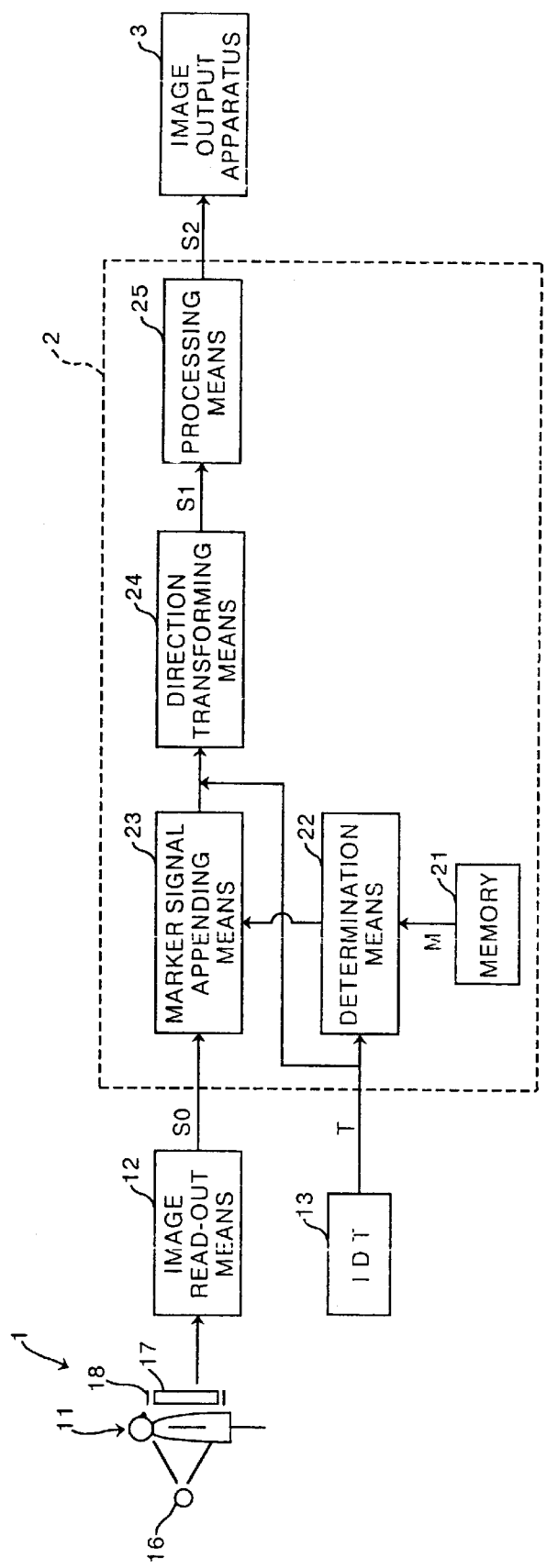
FIG. 1 is a schematic block diagram showing a radiation image output system, in which a first embodiment of the image processing apparatus in accordance with the present invention is employed.

FIG. 1 is a schematic block diagram showing a radiation image output system, in which a first embodiment of the image processing apparatus in accordance with the present invention is employed. As illustrated in FIG. 1, the radiation image output system comprises an image forming apparatus 1 for performing an image recording operation for recording a radiation image of an object, and obtaining an image signal S0 representing the radiation image. The radiation image output system also comprises an image processing apparatus 2 for performing a direction transforming process on the image signal S0 and in accordance with information giving specifics about the image recording technique, appending a marker signal to the image signal S0, and performing image processing, such as gradation processing, processing in the frequency domain, or the like, in order to obtain a processed image signal S2. The radiation image output system further comprises an image output apparatus 3 for reproducing a visible image as a print from the processed image signal S2.

The image forming apparatus 1 comprises image recording means 11, which is provided with a radiation source 16 and a sheet support section 18 for supporting a stimulable phosphor sheet 17. In the image recording means 11, radiation is produced by the radiation source 16 and irradiated to an object, and the radiation carrying image information of the object is irradiated to the stimulable phosphor sheet 17. In this manner, a radiation image of the object is stored on the stimulable phosphor sheet 17. The image forming apparatus 1 also comprises image read-out means 12 for photoelectrically reading out the radiation image from the stimulable phosphor sheet 17, on which the radiation image has been stored, and thereby obtaining the image signal S0 representing the radiation image. The image forming apparatus 1 further comprises an identification terminal (IDT) 13, from which various kinds of information, such as the information representing the name of a patient, the information representing the title of an examination, and the information giving specifics about an image recording technique, are inputted. In the image recording means 11, the object (in this case, a patient) stands facing the stimulable phosphor sheet 17, the radiation is irradiated to the patient from the back side of the patient, and the radiation image of the chest of the patient is recorded on the stimulable phosphor sheet 17. The radiation image is then photoelectrically read out by the image read-out means 12 from the stimulable phosphor sheet 17, on which the radiation image has been stored, and the image signal S0 representing the radiation image of the object is thereby obtained. At the time of the image recording operation, pieces of information (hereinbelow referred to as the ID information T), such as the information representing the name of the patient, the information representing the title of the examination, and the information giving specifics about the image recording technique, are inputted from the IDT 13. In this embodiment, the information, which represents that the patient stood facing the stimulable phosphor sheet 17 and the radiation was irradiated to the patient from the back side of the patient in the image recording operation, is employed as the information giving specifics about the image recording technique.

The image processing apparatus 2 comprises a memory 21 for storing a marker signal M. The image processing apparatus 2 also comprises determination means 22 for determining the direction and the appending position of a marker pattern, which is represented by the marker signal M, in accordance with the ID information T having been received from the IDT 13 of the image forming apparatus 1. The image processing apparatus 2 further comprises marker signal appending means 23 for appending the marker signal M to the image signal S0. The image processing apparatus 2 still further comprises direction transforming means 24 for performing a direction transforming process on the image signal S0, which has been appended with the marker signal M, and in accordance with the ID information T, and thereby obtaining a direction-transformed image signal S1. The image processing apparatus 2 also comprises processing means 25 for performing image processing, such as gradation processing and processing in the frequency domain, on the direction-transformed image signal S1 and thereby obtaining the processed image signal S2.

Figure 2A:
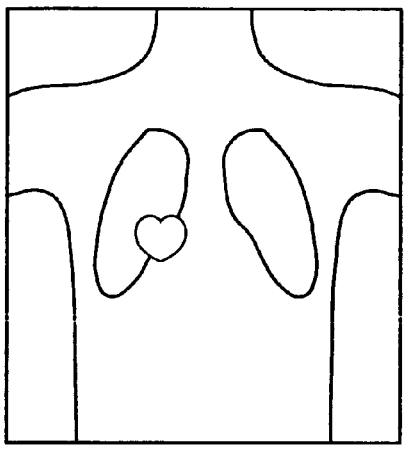
FIG. 2A is an explanatory view showing an example of a radiation image reproduced from an image signal.
Figure 2B:
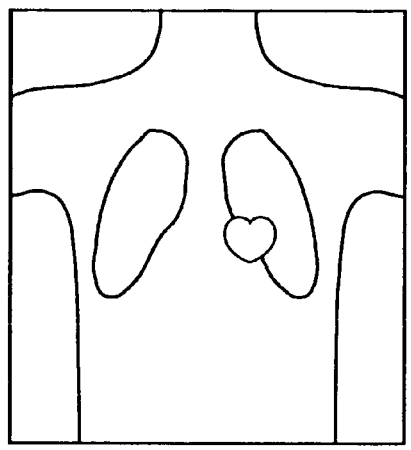
FIG. 2B is an explanatory view showing a radiation image obtained by reversing the radiation image shown in FIG. 2A.

In the determination means 22, the direction and the appending position of the marker signal M with respect to the image signal S0 are determined in the manner described below. Specifically, the radiation image represented by the image signal S0 obtained from the image forming apparatus 1 is the one obtained by performing the image recording operation, in which the patient stood facing the stimulable phosphor sheet 17, the radiation was irradiated from the back side of the patient, and the radiation image of the patient was thereby stored on the stimulable phosphor sheet 17. When the radiation image is reproduced from the image signal S0, the radiation image shown in FIG. 2A is obtained. However, when the radiation image is to be used for making a diagnosis of an illness, as illustrated in FIG. 2B, the radiation image should be reproduced such that the heart pattern is located on the right side as the person, who sees the image, stands facing the image. Therefore, in the direction transforming means 24, the direction transforming process is performed on the image signal S0 and in accordance with the ID information T, such that the right and left sides of the radiation image shown in FIG. 2A, which is represented by the image signal S0, are reversed with respect to an axis extending vertically along the plane of the sheet of FIG. 2A. In this manner, the direction-transformed image signal S1 representing the radiation image shown in FIG. 2B, in which the heart pattern is located on the right side as the person, who sees the image, stands facing the image, is obtained.

Figure 3A:
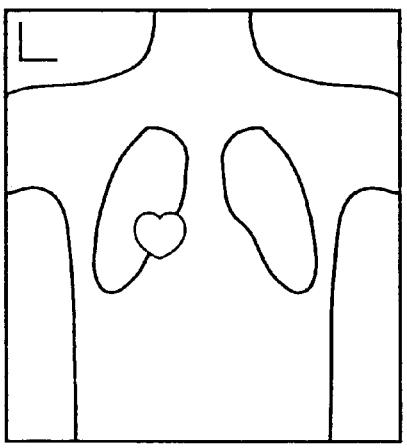
FIG. 3A is an explanatory view showing an example of a radiation image reproduced from an image signal, which has been obtained by performing an image recording operation by use of a marker.
Figure 3B:
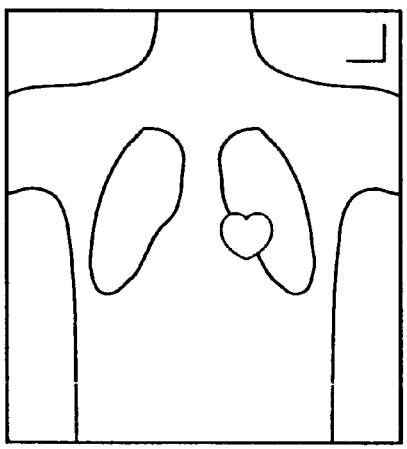
FIG. 3B is an explanatory view showing a radiation image obtained by reversing the radiation image shown in FIG. 13A.
Figure 4:
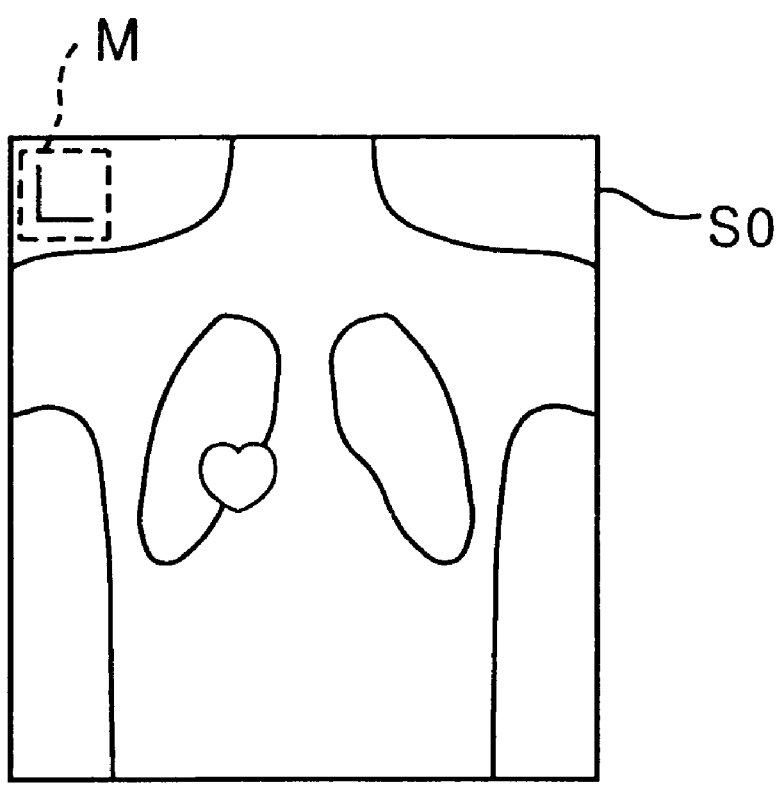
FIG. 4 is an explanatory view showing an example of how a marker signal is appended to an image signal in the first embodiment of the image processing apparatus in accordance with the present invention.

In the image recording operation, an L-shaped marker may be attached to a position on the stimulable phosphor sheet 17, which position corresponds to a position in the vicinity of the left shoulder of the patient, in order to indicated that the position is the left side. In such cases, as illustrated in FIG. 3A, an L-shaped marker pattern is embedded in the image represented by the image signal S0. Also, as illustrated in FIG. 3B, in the image represented by the direction-transformed image signal S1, which is obtained from the process performed by the direction transforming means 24 for reversing the right and left sides of the image, the marker pattern having the reversed L-shape is embedded. Therefore, the medical doctor, who sees the image shown in FIG. 3B, can confirm that the marker pattern has been reversed, and can thereby recognize that the entire image has been reversed. Accordingly, in the determination means 22, the direction and the appending position of the marker signal M with respect to the radiation image represented by the image signal S0 are determined such that, when the image signal S0 is reversed by the direction transforming means 24, the image as shown in FIG. 3B can be obtained, in which the marker pattern having the reversed L-shape is embedded. Also, the marker signal appending means 23 appends the marker signal M to the image signal S0 in accordance with the thus determined direction and the thus determined appending position of the marker signal M. Specifically, as illustrated in FIG. 4, the marker signal M is appended to the image signal S0 such that the L-shaped marker pattern, which is represented by the marker signal M, is embedded in the non-reversed form at a position in the vicinity of the image pattern of the left shoulder of the patient in the image represented by the image signal S0. The appending of the marker signal M to the image signal S0 may be performed by replacing the image signal components of the image signal S0, which correspond to the position to be appended with the marker pattern, by the marker signal M, or by appending the marker signal M to the image signal S0 as an overlay signal for the image signal S0.

In the manner described above, the marker signal M is appended to the image signal S0. Therefore, as illustrated in FIG. 3B, when a visible image is reproduced from the direction-transformed image signal S1, which has been obtained by reversing the image signal S0 having been appended with the marker signal M, the reproduced image can be obtained in the same manner as that in the cases where the image recording operation was performed by use of a marker.

Figure 5:
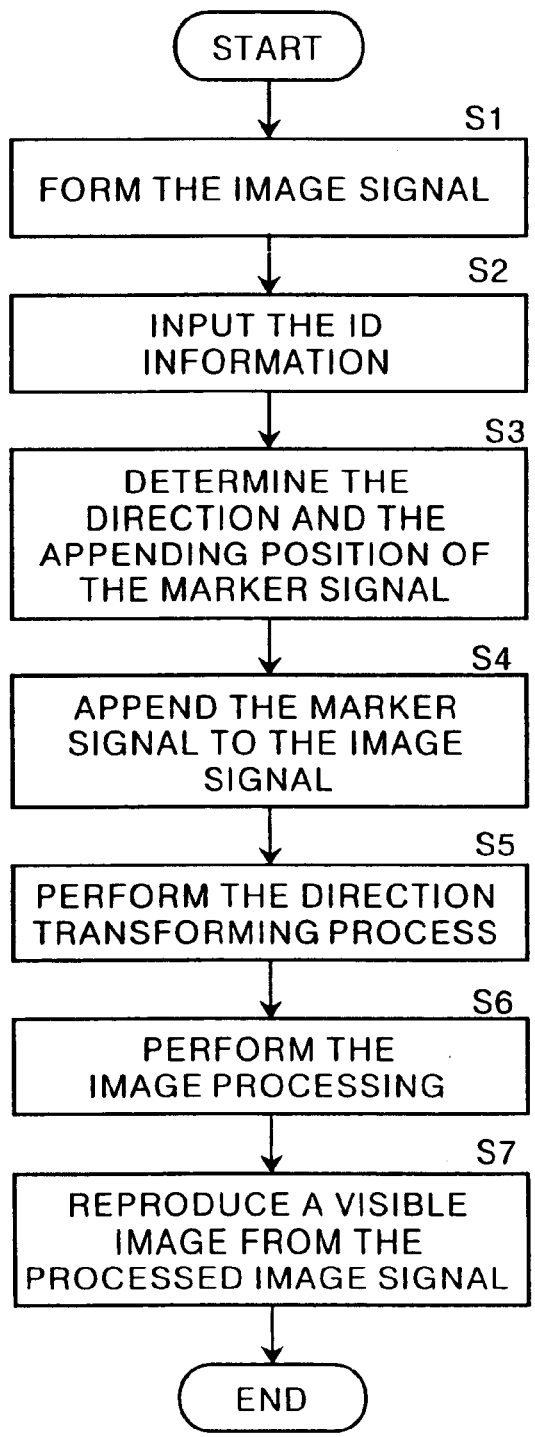
FIG. 5 is a flow chart showing how the first embodiment of the image processing apparatus in accordance with the present invention operates.

How the first embodiment of the image processing apparatus in accordance with the present invention operates will be described hereinbelow. FIG. 5 is a flow chart showing how the first embodiment of the image processing apparatus in accordance with the present invention operates. Firstly, in a step S1, the image forming apparatus 1 performs the image recording operation for recording the radiation image of the object, such as the patient, and forms the image signal S0 representing the radiation image. At this time, in a step S2, the ID information T representing the name of the patient, the examination number, specifics about the image recording technique, and the like, is inputted from the IDT 13. The image signal S0 and the ID information T are fed into the image processing apparatus 2. In a step S3, the determination means 22 of the image processing apparatus 2 reads the marker signal M from the memory 21 and determines the direction and the appending position of the marker signal M in accordance with the ID information T. In a step S4, the marker signal appending means 23 appends the marker signal M to the image signal S0 as illustrated in FIG. 4. In cases where the marker signal M is thus appended to the image signal S0, when a visible image is reproduced from the image signal S0 appended with the marker signal M, the radiation image shown in FIG. 3A is obtained.

In a step S5, the image signal S0 appended with the marker signal M is fed into the direction transforming means 24, and the direction transforming process is performed by the direction transforming means 24 in accordance with the ID information T. From the direction transforming process, the direction-transformed image signal S1 is obtained. In cases where a visible image is reproduced from the direction-transformed image signal S1, the radiation image shown in FIG. 3B is obtained. In a step S6, the thus obtained direction-transformed image signal S1 is fed into the processing means 25, and the image processing, such as the gradation processing or processing in the frequency domain, is performed by the processing means 25 on the direction-transformed image signal S1. The processed image signal S2 is obtained from the image processing. Thereafter, in a step S7, the processed image signal S2 is fed into the image output apparatus 3 and utilized for reproducing a visible image to be used in making a diagnosis.

As described above, in the first embodiment, the direction and the appending position of the marker signal M are determined in accordance with the ID information T representing various characteristics of the image recording operation. In accordance with the determined direction and the determined appending position of the marker signal M, the marker signal M is appended to the image signal S0. Therefore, in accordance with the direction transforming process performed on the image signal S0, the marker signal M can be appended to the image signal S0 in the same manner as that in the cases where the image recording operation is performed by use of a marker. Accordingly, the problems can be prevented from occurring in that the person, who sees the radiation image, misunderstands the reversion of the radiation image or the direction of rotation of the radiation image and makes an incorrect diagnosis, or the like.

Figure 6:
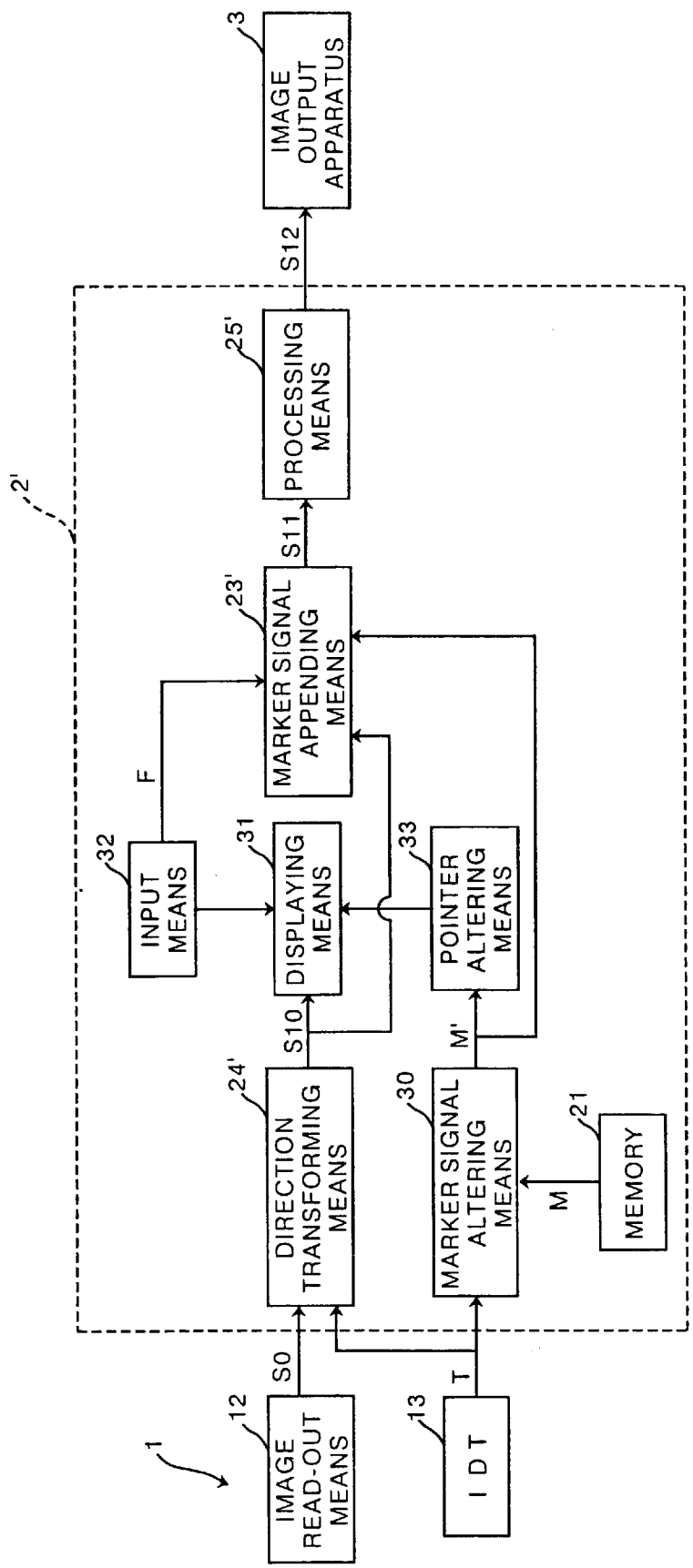
FIG. 6 is a schematic block diagram showing a radiation image output system, in which a second embodiment of the image processing apparatus in accordance with the present invention is employed.

A second embodiment of the image processing apparatus in accordance with the present invention will be described hereinbelow. FIG. 6 is a schematic block diagram showing a radiation image output system, in which a second embodiment of the image processing apparatus in accordance with the present invention is employed. In FIG. 6, similar elements are numbered with the same reference numerals with respect to FIG. 1. Also, in FIG. 6, as for the image forming apparatus 1, only the image read-out means 12 and the IDT 13 are illustrated.

With reference to FIG. 6, an image processing apparatus 2' comprises the memory 21 for storing the marker signal M, and marker signal altering means 30 for altering the direction of the marker signal M in accordance with the ID information T, which has been received from the IDT 13 of the image forming apparatus 1, and thereby obtaining a direction-altered marker signal M'. The image processing apparatus 2' also comprises direction transforming means 24' for performing the direction transforming process on the image signal S0 in accordance with the ID information T and thereby obtaining a direction-transformed image signal S10. The image processing apparatus 2' further comprises displaying means 31, which displays the image represented by the direction-transformed image signal S10 and which may be constituted of a CRT monitor, a liquid crystal monitor, or the like. The image processing apparatus 2' still further comprises input means 32, from which various instructions are given to the displaying means 31 and which may be constituted of a mouse device, a keyboard, or the like. The image processing apparatus 2' also comprises pointer altering means 33 for altering the shape of a pointer, which is displayed on the displaying means 31, to the shape of the marker pattern represented by the direction-altered marker signal M'. The image processing apparatus 2' further comprises marker signal appending means 23' for appending the direction-altered marker signal M' to the image signal S0 in accordance with a marker pattern appending instruction F, which is specified from the input means 32 as will be described later, and thereby obtaining an image signal S11. The image processing apparatus 2' still further comprises processing means 25' for performing the image processing, such as the gradation processing or processing in the frequency domain, on the image signal S11 and thereby obtaining a processed image signal S12.

Figure 7:
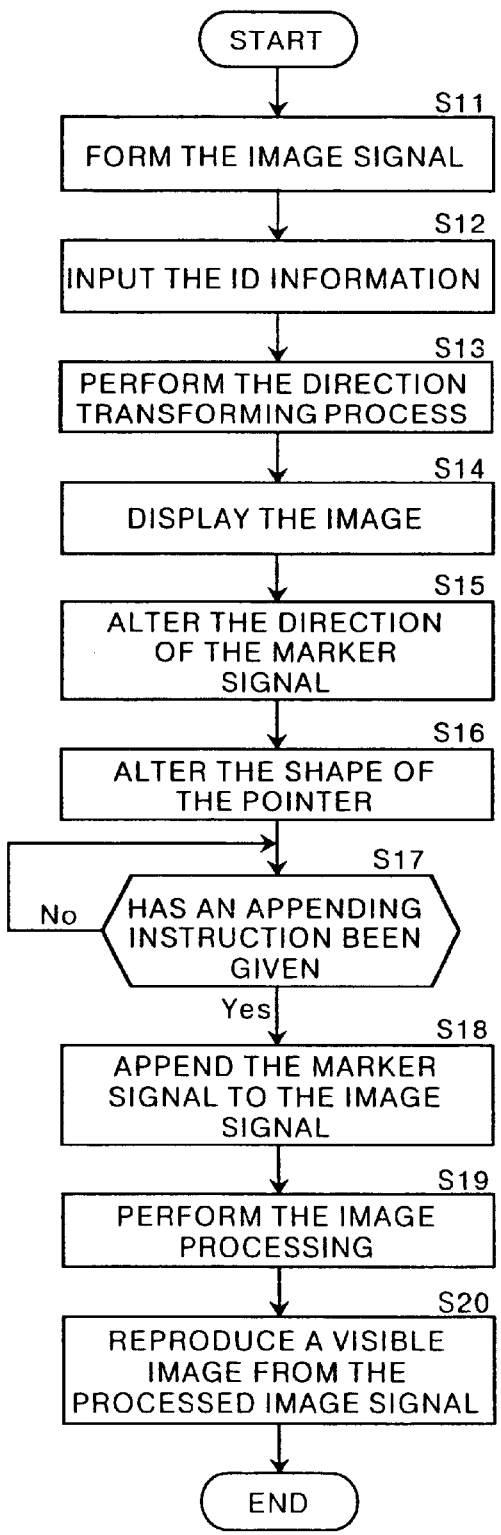
FIG. 7 is a flow chart showing how the second embodiment of the image processing apparatus in accordance with the present invention operates.
Figure 8A:
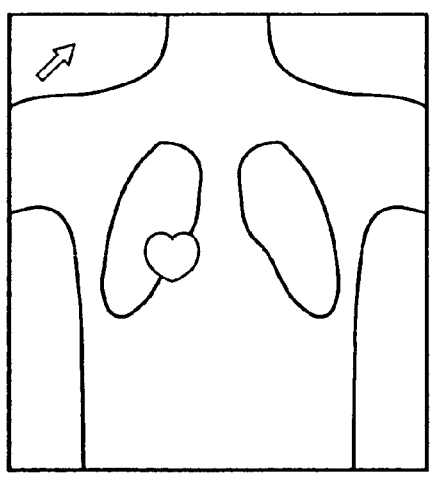
FIGS. 8A, 8B, and 8C are explanatory views showing how a marker signal is appended in the second embodiment.
Figure 8B:
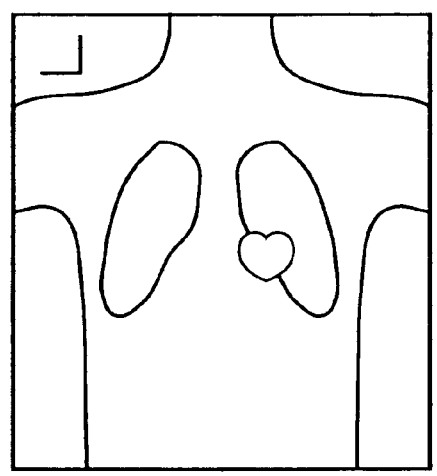
Figure 8C:
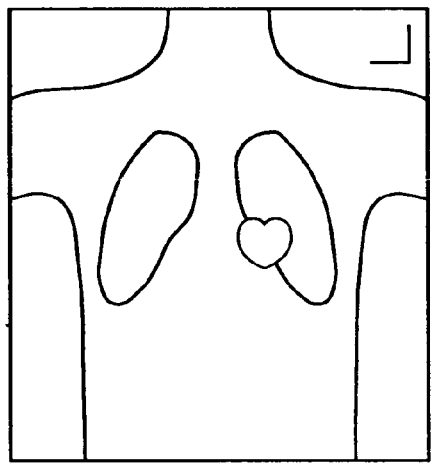

How the second embodiment of the image processing apparatus in accordance with the present invention operates will be described hereinbelow. FIG. 7 is a flow chart showing how the second embodiment of the image processing apparatus in accordance with the present invention operates. FIGS. 8A, 8B, and 8C show how the images are displayed on the displaying means 31. Firstly, in a step S11, the image forming apparatus 1 performs the image recording operation for recording the radiation image of the object, such as the patient, and forms the image signal S0 representing the radiation image. At this time, in a step S12, the ID information T representing the name of the patient, the examination number, specifics about the image recording technique, and the like, is inputted from the IDT 13. The image signal S0 and the ID information T are fed into the image processing apparatus 2'. In a step S13, the direction transforming means 24' of the image processing apparatus 2 performs the direction transforming process on the image signal S0, and the direction-transformed image signal S10 is thereby obtained. In a step S14, the image represented by the direction-transformed image signal S10 is displayed on the displaying means 31.

By way of example, the radiation image represented by the image signal S0 obtained from the image forming apparatus 1 may be the one obtained by performing the image recording operation, in which the patient stood facing the stimulable phosphor sheet 17, the radiation was irradiated from the back side of the patient, and the radiation image of the patient was thereby stored on the stimulable phosphor sheet 17. In such cases, when the radiation image is reproduced from the image signal S0, the radiation image shown in FIG. 2A is obtained. In the direction transforming means 24' of the image processing apparatus 2', the direction transforming process is performed on the image signal S0 and in accordance with the ID information T, such that the right and left sides of the radiation image shown in FIG. 2A, which is represented by the image signal S0, are reversed with respect to an axis extending vertically along the plane of the sheet of FIG. 2A. In this manner, the direction-transformed image signal S1 representing the radiation image shown in FIG. 2B, in which the heart pattern is located on the right side as the person, who sees the image, stands facing the image, is obtained. Also, the radiation image shown in FIG. 2B is displayed on the displaying means 31.

In a step S15, the marker signal altering means 30 reads the marker signal M from the memory 21 and alters the direction of the marker signal M in accordance with the ID information T. In this manner, the direction-altered marker signal M' is obtained. In a step S16, the pointer altering means 33 alters the shape of the pointer, which is displayed on the displaying means 31, into the shape of the marker pattern represented by the direction-altered marker signal M'. For example, in cases where the marker pattern represented by the marker signal M is the one having the L-shape, the marker pattern represented by the direction-altered marker signal M' has the reversed L-shape, whose right and left sides have been reversed. Therefore, in cases where the pointer has the arrow shape as illustrated in FIG. 8A, as a result of the processing performed in the step S16, as illustrated in FIG. 8B, the shape of the pointer is altered into the reversed L-shape, whose right and left sides have been reversed.

The mouse device of the input means 32 is then operated to shift the position of the pointer on the image displayed on the displaying means 31. As a result, the marker pattern to be appended moves. In a step S17, a judgment is made as to whether the marker pattern appending instruction has been or has not been given at a desired appending position by the input means 32. In cases where it has been judged that the marker pattern appending instruction has been given, the marker pattern appending instruction F is inputted into the marker signal appending means 23'.

In a step S18, the marker signal appending means 23 appends the direction-altered marker signal M' to the direction-transformed image signal S10 in accordance with the marker pattern appending instruction F, and the image signal S11 is thereby obtained. When the image is reproduced from the image signal S11, the image shown in FIG. 8C is obtained. In a step S19, the image signal S11 having thus been appended with the direction-altered marker signal M' is fed into the processing means 25', and the image processing, such as the gradation processing or the processing in the frequency domain, is performed on the image signal S11. In this manner, the processed image signal S12 is obtained. In a step S20, the processed image signal S12 is fed into the image output apparatus 3 and is utilized for reproducing a visible image. The visible image is used for making a diagnosis.

As described above, with the second embodiment, the image represented by the direction-transformed image signal S10 is displayed on the displaying means 31, and the shape of the pointer displayed on the displaying means 31 is altered into the shape of the marker pattern, which is represented by the direction-altered marker signal M'. Also, in accordance with the marker pattern appending instruction given at a desired position on the image, the direction-altered marker signal M' is appended to the direction-transformed image signal S10. Therefore, the image in the state in which the marker pattern is appended can be confirmed on the displaying means 31, and the marker pattern appending position can be determined easily.

Figure 9:
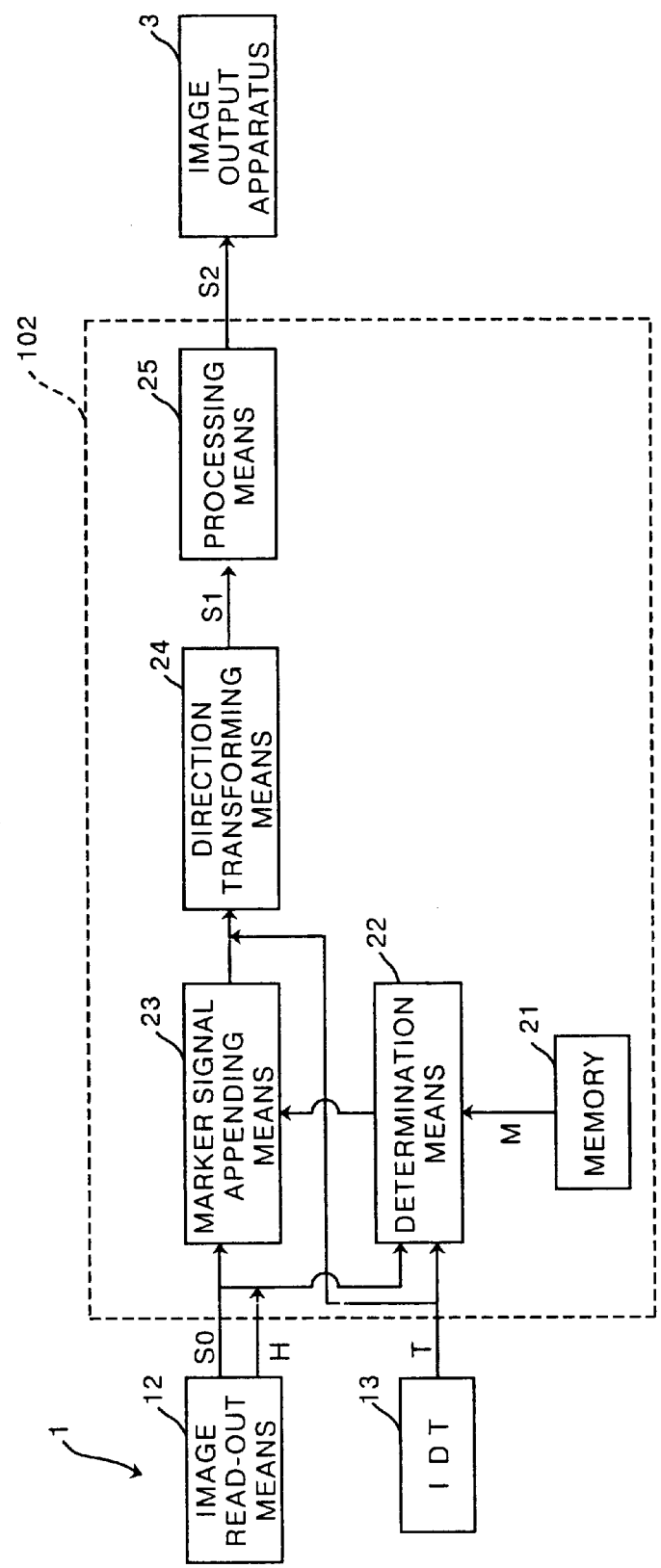
FIG. 9 is a schematic block diagram showing a radiation image output system, in which a third embodiment of the image processing apparatus in accordance with the present invention is employed.

A third embodiment of the image processing apparatus in accordance with the present invention will be described hereinbelow. FIG. 9 is a schematic block diagram showing a radiation image output system, in which a third embodiment of the image processing apparatus in accordance with the present invention is employed. In FIG. 9, similar elements are numbered with the same reference numerals with respect to FIG. 1. Also, in FIG. 9, as for the image forming apparatus 1, only the image read-out means 12 and the IDT 13 are illustrated.

With reference to FIG. 9, in an image processing apparatus 102, the determination means 22 alters the size of the marker signal M in accordance with the size of the image, which is represented by the image signal S0, and/or the read-out density information H, with which the image signal S0 was obtained in the image read-out means 12. Also, the determination means 22 determines the direction and the appending position of the marker pattern in accordance with the image recording technique. Further, the marker signal appending means 23 appends the marker signal M to the image signal S0. Therefore, the image signal S0 and/or read-out density information H is fed from the image read-out means 12 into the determination means 22.

In the determination means 22, the size of the marker signal M is altered in the manner described below. In this embodiment, it is assumed that the marker signal M has a size adapting to an image having a predetermined size or to an image having been obtained with a predetermined read-out density. Firstly, alteration of the size of the marker signal M in accordance with the size of the image signal S0 is performed in the manner described below. Specifically, the ratio between the length of the longer side of the image, which is represented by the image signal S0, and the length of the longer side of the image having the predetermined size is calculated. In accordance with the calculated ratio, the size of the marker signal M is altered. For example, the image having the predetermined size may have a 800×600 size, the image represented by the image signal S0 may have a 1,200×900 size, and the marker pattern represented by the marker signal M may have a 40×30 size. In such cases, the size of the marker signal M is altered to a size 1.5 times as large as the original size, i.e. to a 60×45 size.

Alteration of the size of the marker signal M in accordance with the read-out density information H is performed in the manner described below. Specifically, the size of the marker signal M is altered in accordance with the ratio between the pixel size in the image, which is read out with the predetermined read-out density, and the pixel size in the image, which is represented by the image signal S0, such that the size of the marker pattern on the image may be kept as a predetermined size regardless of the pixel size. For example, in cases where the predetermined read-out density is 600 dpi and the read-out density, with which the image signal S0 was obtained, is 1,200 dpi, the pixel size in the image represented by the image signal S0 is one half of the pixel size in the image, which is read out with the predetermined read-out density. Therefore, in cases where the size of the marker pattern is a 40×30 size, the size of the marker signal M is altered to a size two times as large as the original size, i.e. to a 80×60 size, such that the size of the marker pattern may not be altered on the image represented by the image signal S0.

In cases where the size of the marker signal M is to be altered in accordance with both the size of the image, which is represented by the image signal S0, and the read-out density information H, the size of the marker signal M may be altered in accordance with the ratio between the length of the longer side of the image, which is represented by the image signal S0, and the length of the longer side of the image having the predetermined size, and in accordance with the ratio between the pixel size in the image, which is read out with the predetermined read-out density, and the pixel size in the image, which is represented by the image signal S0.

Figure 10:
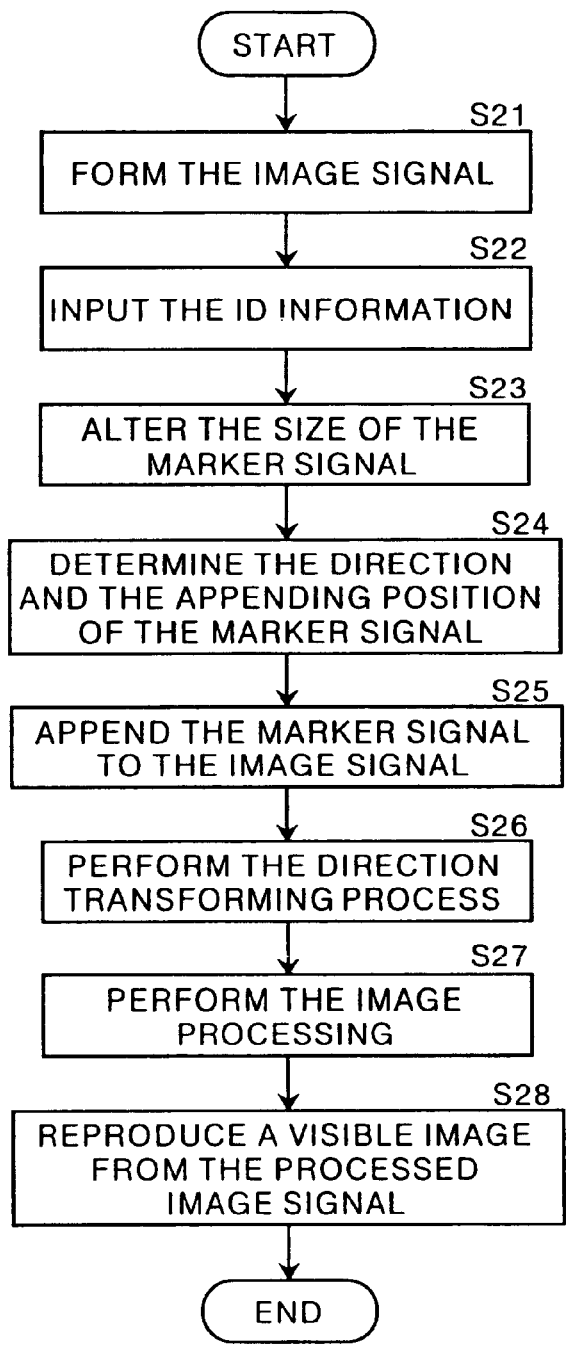
FIG. 10 is a flow chart showing how the third embodiment of the image processing apparatus in accordance with the present invention operates.

How the third embodiment of the image processing apparatus in accordance with the present invention operates will be described hereinbelow. FIG. 10 is a flow chart showing how the third embodiment of the image processing apparatus in accordance with the present invention operates. Firstly, in a step S21, the image forming apparatus 1 performs the image recording operation for recording the radiation image of the object, such as the patient, and forms the image signal S0 representing the radiation image. At this time, in a step S22, the ID information T representing the name of the patient, the examination number, specifics about the image recording technique, and the like, is inputted from the IDT 13. The image signal S0, the ID information T, and the read-out density information H representing the read-out density, with which the image signal S0 was obtained, are fed into the image processing apparatus 102. In a step S23, the determination means 22 of the image processing apparatus 102 reads the marker signal M from the memory 21 and alters the size of the marker signal M in accordance with the size of the image, which is represented by the image signal S0, and/or the read-out density information H. Also, in a step S24, the determination means 22 determines the direction and the appending position of the marker signal M in accordance with the ID information T. In a step S25, the marker signal appending means 23 appends the marker signal M to the image signal S0.

In steps S26, S27, and S28, as in the steps S5, S6, and S7 in the first embodiment described above, the direction transforming process, the image processing, and reproduction of a visible image from the processed image signal S2 are performed.

As described above, with the third embodiment, the size of the marker signal M is altered in accordance with the size of the image, which is represented by the image signal S0, and/or the read-out density, with which the image signal S0 was obtained. Therefore, the marker pattern adapting to the size of the image, which is represented by the image signal, and/or the read-out density, with which the image signal was obtained, can be displayed on the image. Therefore, the marker pattern which is easy to see can be obtained.

Figure 11:
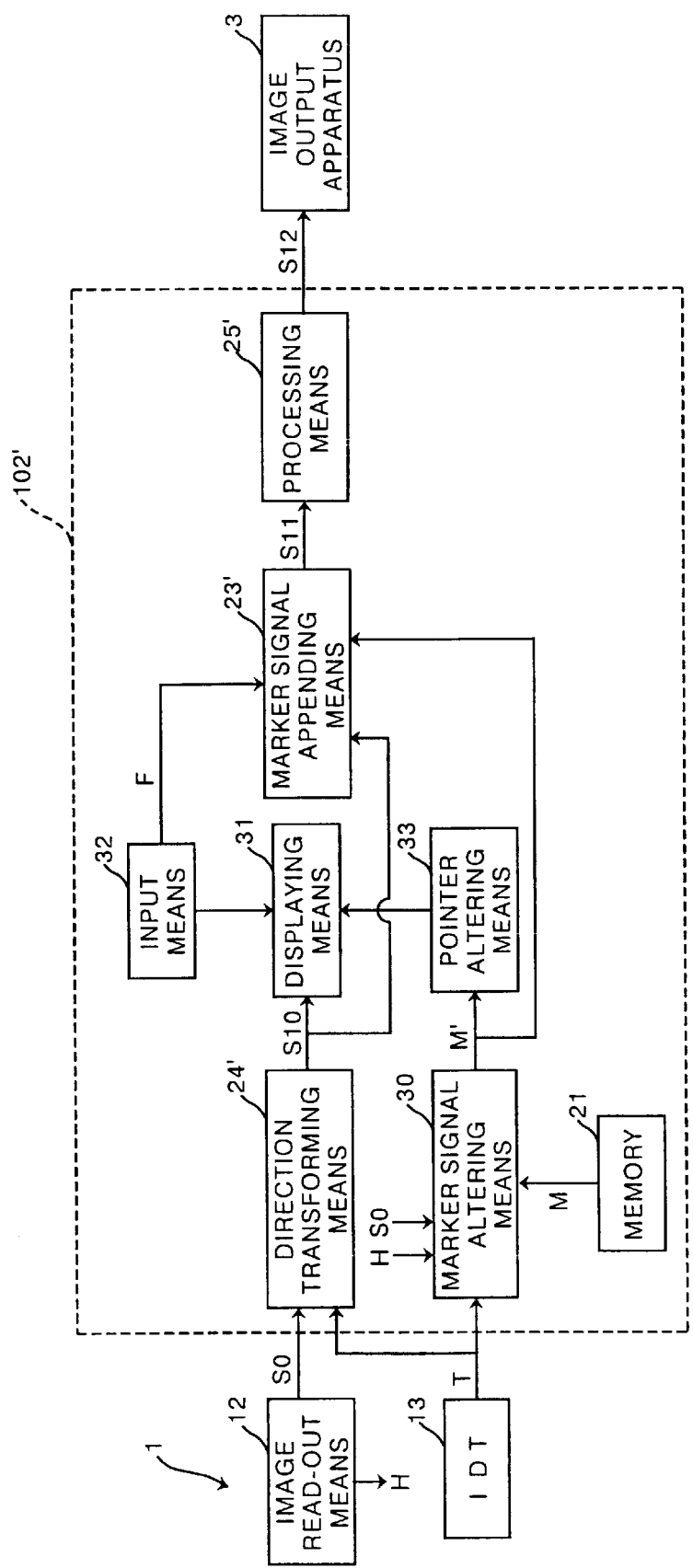
FIG. 11 is a schematic block diagram showing a radiation image output system, in which a fourth embodiment of the image processing apparatus in accordance with the present invention is employed.

As in an image processing apparatus 102' which constitutes a fourth embodiment and is shown in FIG. 11, the image signal S0 and/or the read-out density information H fed from the image read-out means 12 may be inputted into the marker signal altering means 30 of the image processing apparatus 2' shown in FIG. 6. Also, in the marker signal altering means 30, as in the determination means 22 in the third embodiment of FIG. 9, the size of the marker signal M may be altered in accordance with the size of the image, which is represented by the image signal S0, and/or the read-out density, with which the image signal S0 was obtained.

Figure 12:
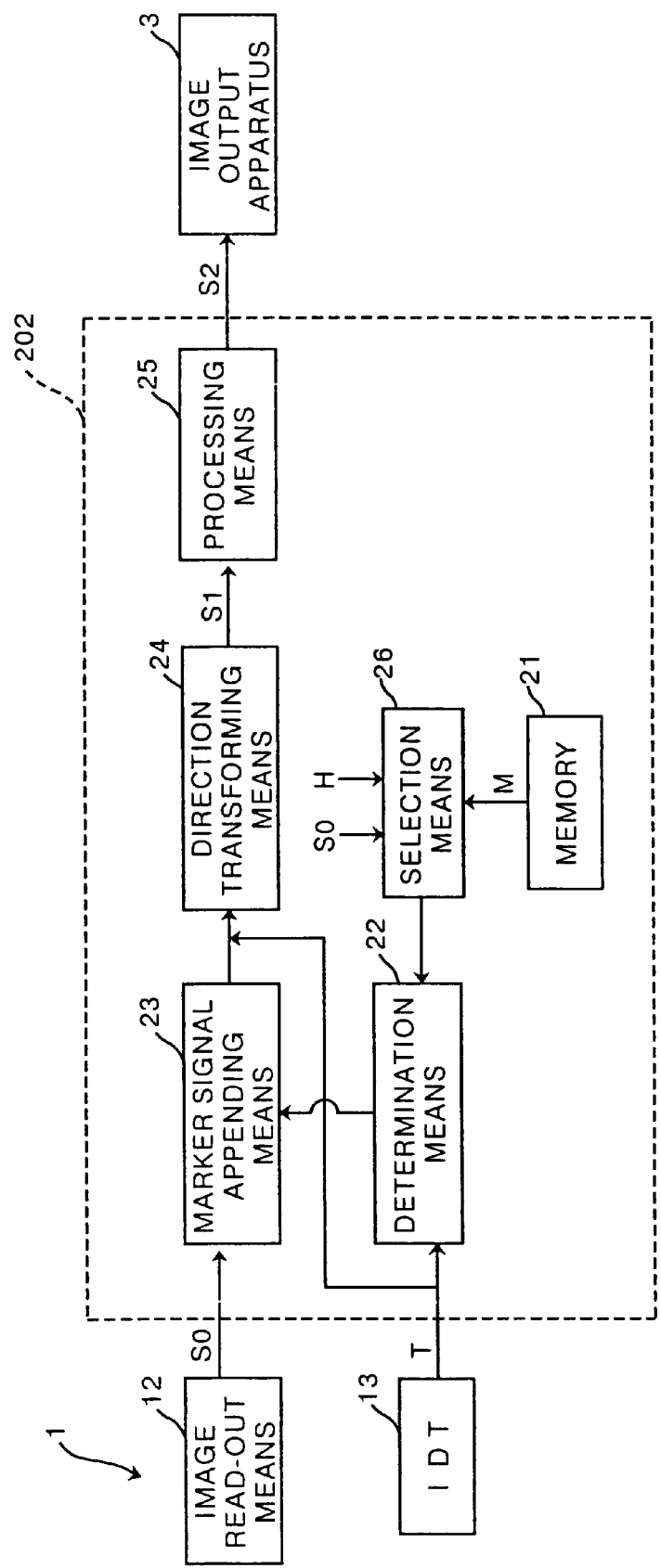
FIG. 12 is a schematic block diagram showing a radiation image output system, in which a fifth embodiment of the image processing apparatus in accordance with the present invention is employed.

A fifth embodiment of the image processing apparatus in accordance with the present invention will be described hereinbelow. FIG. 12 is a schematic block diagram showing a radiation image output system, in which a fifth embodiment of the image processing apparatus in accordance with the present invention is employed. In FIG. 12, similar elements are numbered with the same reference numerals with respect to FIG. 1. Also, in FIG. 12, as for the image forming apparatus 1, only the image read-out means 12 and the IDT 13 are illustrated.

With reference to FIG. 12, in an image processing apparatus 202, a plurality of marker signals M, M, . . . , which represent marker patterns having different sizes and having been prepared previously, are stored in the memory 21. Also, selection means 26 selects a marker signal M representing a marker pattern having a size adapting to the size of the image, which is represented by the image signal S0, and/or the read-out density, with which the image signal S0 was obtained. The selection is made from the plurality of the marker signals M, M, . . . of different sizes, which are stored in the memory 21. Further, by the utilization of the selected marker signal M, the determination means 22 determines the direction and the appending position of the marker pattern in accordance with the image recording technique. Therefore, the image signal S0 and/or read-out density information H is fed from the image read-out means 12 into the selection means 26.

In the selection means 26, the size of the marker signal M is selected in the manner described below. In this embodiment, it is assumed that the predetermined reference image size and the predetermined reference read-out density have been set previously. Firstly, selection of the size of the marker signal M in accordance with the size of the image signal S0 is performed in the manner described below. Specifically, the ratio between the length of the longer side of the image, which is represented by the image signal S0, and the length of the longer side of the image having the predetermined size is calculated. In accordance with the calculated ratio, the size of the marker signal M is selected. For example, the image having the predetermined size may have a 800×600 size, the image represented by the image signal S0 may have a 1,200×900 size, and the marker pattern, which is represented by the marker signal M and which adapts to the image of the predetermined size, may have a 40×30 size. In such cases, the marker signal M of a size 1.5 times as large as the aforesaid size, i.e. a 60×45 size, is selected.

Selection of the size of the marker signal M in accordance with the read-out density information H is performed in the manner described below. Specifically, the size of the marker signal M is selected in accordance with the ratio between the pixel size in the image, which is read out with the predetermined read-out density, and the pixel size in the image, which is represented by the image signal S0, such that the size of the marker pattern on the image may be kept as a predetermined size regardless of the pixel size. For example, in cases where the predetermined read-out density is 600 dpi and the read-out density, with which the image signal S0 was obtained, is 1,200 dpi, the pixel size in the image represented by the image signal S0 is one half of the pixel size in the image, which is read out with the predetermined read-out density. Therefore, in cases where the size of the marker pattern adapting to the predetermined read-out density is a 40×30 size, the marker signal M of a size two times as large as the aforesaid size, i.e. a 80×60 size, is selected such that the size of the marker pattern may not be altered on the image represented by the image signal S0.

In cases where the size of the marker signal M is to be selected in accordance with both the size of the image, which is represented by the image signal S0, and the read-out density information H, the size of the marker signal M may be selected in accordance with the ratio between the length of the longer side of the image, which is represented by the image signal S0, and the length of the longer side of the image having the predetermined size, and in accordance with the ratio between the pixel size in the image, which is read out with the predetermined read-out density, and the pixel size in the image, which is represented by the image signal S0.

Figure 13:
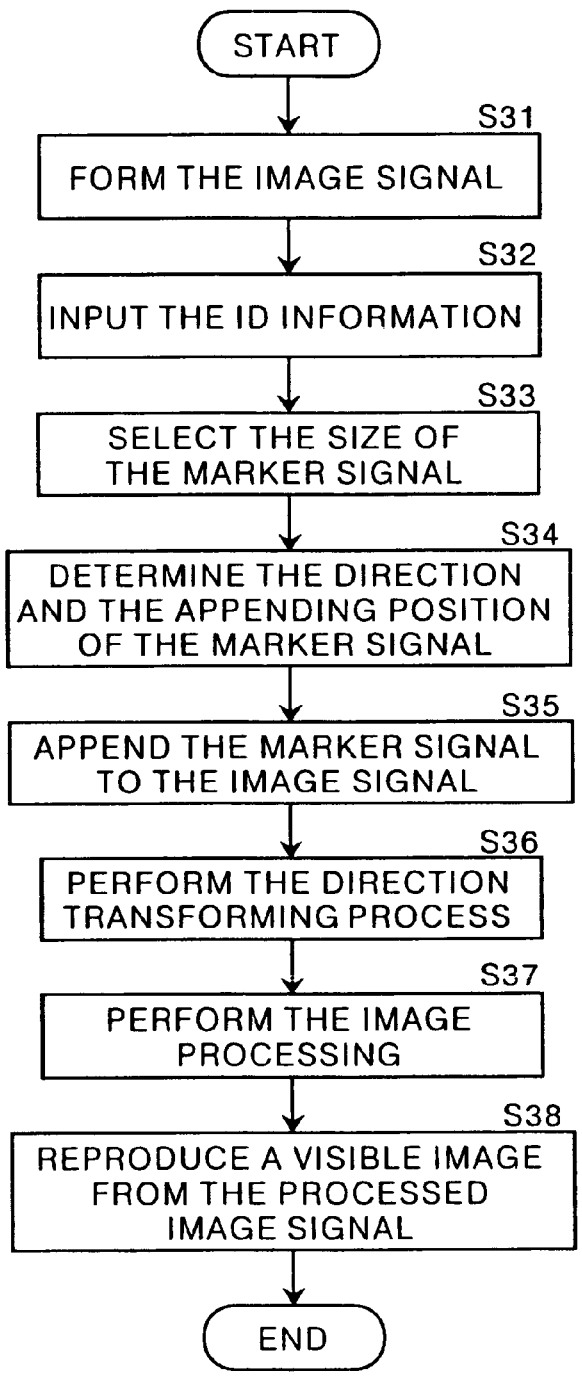
FIG. 13 is a flow chart showing how the fifth embodiment of the image processing apparatus in accordance with the present invention operates.

How the fifth embodiment of the image processing apparatus in accordance with the present invention operates will be described hereinbelow. FIG. 13 is a flow chart showing how the fifth embodiment of the image processing apparatus in accordance with the present invention operates. Firstly, in steps S31 and S32, as in the steps S1 and S2 in the first embodiment described above, formation of the image signal S0 and the feeding of the ID information T are performed. Also, the image signal S0, the ID information T, and the read-out density information H representing the read-out density, with which the image signal S0 was obtained, are fed into the image processing apparatus 202. In a step S33, the selection means 26 of the image processing apparatus 202 selects the size of the marker signal M in accordance with the size of the image, which is represented by the image signal S0, and/or the read-out density information H. Also, in a step S34, the marker signal M of the selected size is read from the memory 21, and the direction and the appending position of the marker signal M are determined in accordance with the ID information T. In a step S35, the marker signal appending means 23 appends the marker signal M to the image signal S0.

In steps S36, S37, and S38, as in the steps S5, S6, and S7 in the first embodiment described above, the direction transforming process, the image processing, and reproduction of a visible image from the processed image signal S2 are performed.

As described above, with the fifth embodiment, the marker signal M representing the marker pattern having the size adapting to the size of the image, which is represented by the image signal S0, and/or the read-out density, with which the image signal S0 was obtained, is selected from a plurality of marker signals M, M, . . . , which represent marker patterns having different sizes and having been prepared previously in the memory 21. The selected marker signal M is appended to the image signal S0. Therefore, the marker pattern having the size adapting to the size of the image, which is represented by the image signal S0, and/or the read-out density, with which the image signal S0 was obtained, can be displayed on the image. Accordingly, the marker pattern which is easy to see can be obtained.

Figure 14:
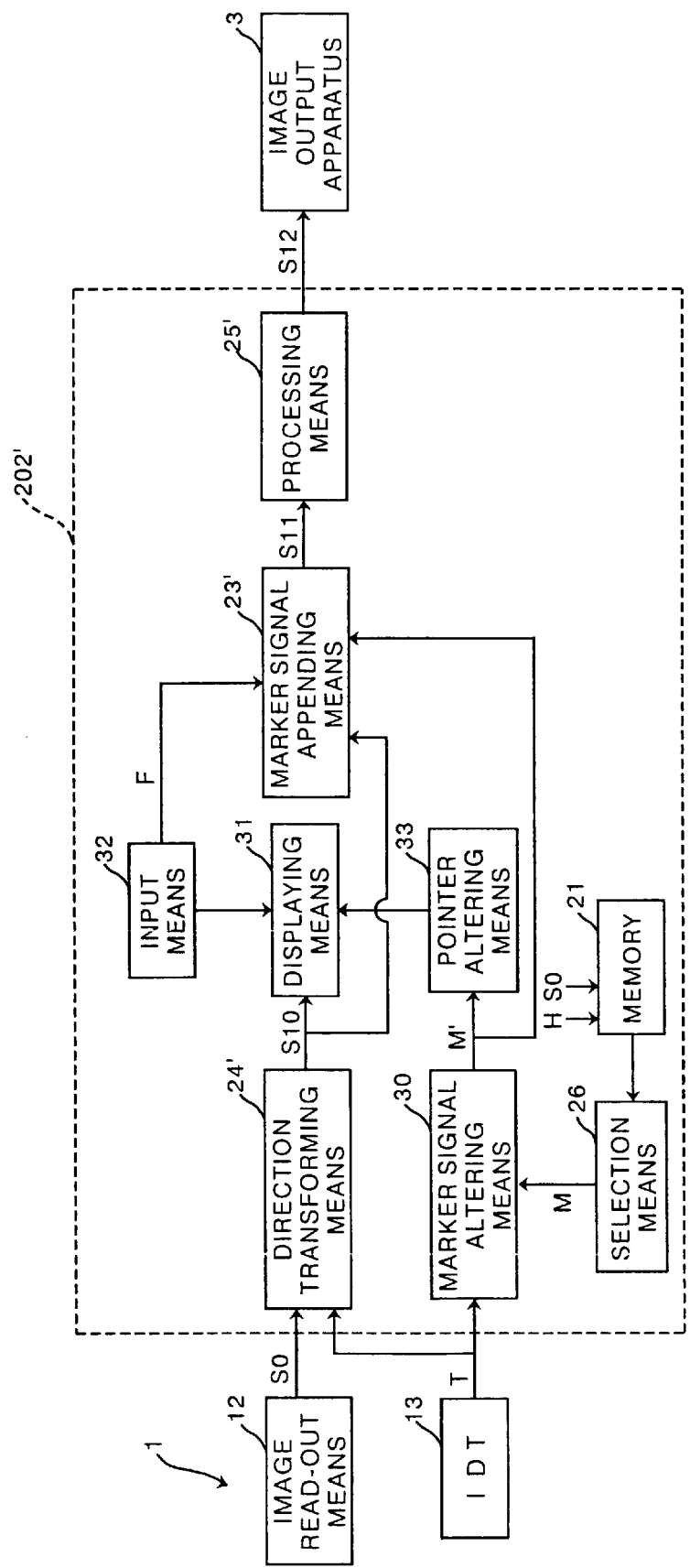
FIG. 14 is a schematic block diagram showing a radiation image output system, in which a sixth embodiment of the image processing apparatus in accordance with the present invention is employed.

As in an image processing apparatus 202' shown in FIG. 14, which constitutes a sixth embodiment, a plurality of marker signals M, M, . . . , which represent marker patterns having different sizes, may be stored in the memory 21 of the image processing apparatus 2' shown in FIG. 6, and the selection means 26 may be provided. In the selection means 26, the marker signal M representing the marker pattern having the size adapting to the size of the image, which is represented by the image signal S0, and/or the read-out density, with which the image signal S0 was obtained in the image read-out means 12, may be selected from the plurality of the marker signals M, M, . . . , which represent marker patterns having different sizes and having been stored in the memory 21. Also, in the marker signal altering means 30, by use of the selected marker signal M, the direction of the marker pattern may be determined in accordance with the image recording technique.

In the first to sixth embodiments described above, if the image signal components of the image signal S0, which correspond to the position in the vicinity of the appending position of the marker signal M, take signal values (for example, in the cases of 8 bits, 255 or values close to 255) approximately identical with the signal value of the marker signal M, the marker pattern will become imperceptible in the reproduced image appended with the marker pattern. Therefore, as in an image processing apparatus 302 shown in FIG. 15, which constitutes a seventh embodiment, signal value altering means 40 should preferably be located between the direction transforming means 24 and the processing means 25. The signal value altering means 40 operates such that, in cases where the signal value of the marker signal M and signal values of image signal components of the direction-transformed image signal S1, which image signal components correspond to the position in the vicinity of the appending position of the marker signal M, approximately coincide with each other, the signal value altering means 40 alters the signal value of the marker signal M and/or the signal values of the image signal components of the direction-transformed image signal S1, which image signal components correspond to the position in the vicinity of the appending position of the marker signal M.

By way of example, the signal value altering means 40 calculates the difference value between the signal value of the marker signal M and the signal values of the image signal components of the direction-transformed image signal S1, which image signal components correspond to the position in the vicinity of the appending position of the marker signal M. Also, in cases where the calculated difference value is smaller than a predetermined threshold value, the signal value altering means 40 alters the signal value of the marker signal M and/or the signal values of the image signal components of the direction-transformed image signal S1, which image signal components correspond to the position in the vicinity of the appending position of the marker signal M. Specifically, the signal value of the marker signal M may be altered to the inverted values of the signal values of the aforesaid image signal components of the direction-transformed image signal S1. Alternatively, the signal value of the marker signal M may be altered to the values, which are obtained by adding a predetermined value to the signal values of the aforesaid image signal components of the direction-transformed image signal S1. As another alternative, the signal value of the marker signal M may be altered to the values, which are obtained by subtracting a predetermined value from the signal values of the aforesaid image signal components of the direction-transformed image signal S1. As a further alternative, the signal values of the aforesaid image signal components of the direction-transformed image signal S1 may be altered to the inverted value of the signal value of the marker signal M. As a still further alternative, the signal values of the aforesaid image signal components of the direction-transformed image signal S1 may be altered to the value, which is obtained by adding a predetermined value to the signal value of the marker signal M. As another alternative, the signal values of the aforesaid image signal components of the direction-transformed image signal S1 may be altered to the value, which is obtained by subtracting a predetermined value from the signal value of the marker signal M. In this manner, the signal value of the marker signal M and/or the signal values of the image signal components of the direction-transformed image signal S1, which image signal components correspond to the position in the vicinity of the appending position of the marker signal M, can be altered.

In the manner described above, with the seventh embodiment of FIG. 15, in cases where the signal value of the marker signal M and signal values of image signal components of the direction-transformed image signal S1, which image signal components correspond to the position in the vicinity of the appending position of the marker signal M, approximately coincide with each other, the signal value of the marker signal M and/or the signal values of the image signal components of the direction-transformed image signal S1, which image signal components correspond to the position in the vicinity of the appending position of the marker signal M, are altered. With the seventh embodiment, for example, when a white marker pattern is appended to a white region in the image, the marker pattern can be kept easy to see.

Figure 15:
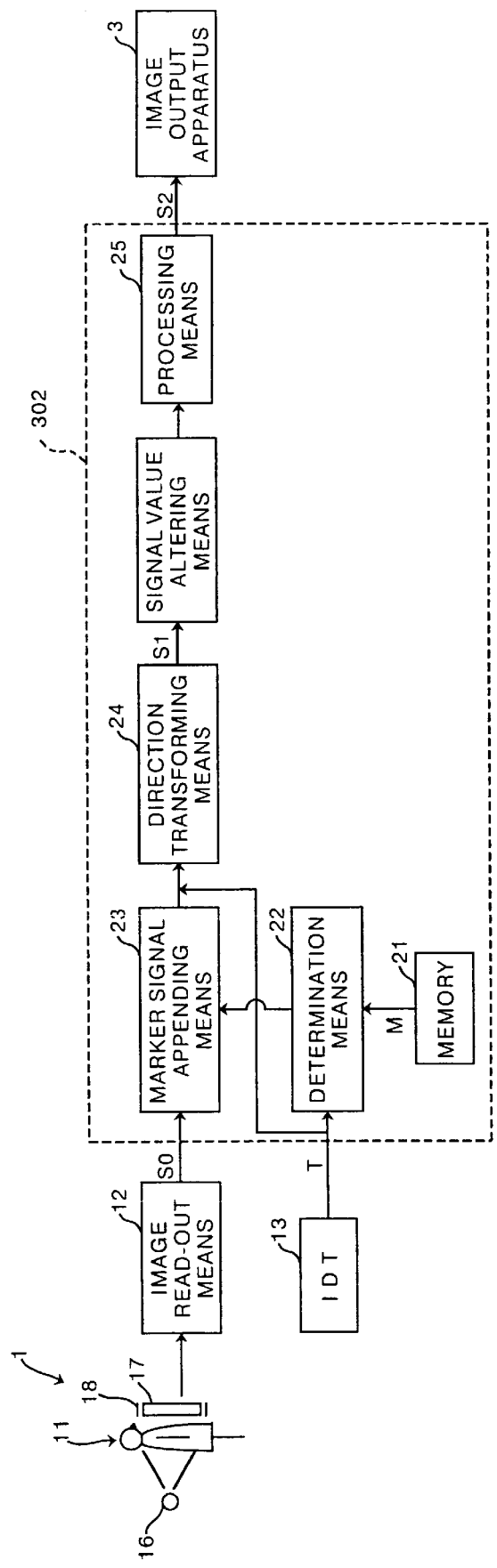
FIG. 15 is a schematic block diagram showing a radiation image output system, in which a seventh embodiment of the image processing apparatus in accordance with the present invention is employed.

In the seventh embodiment of FIG. 15, the signal value altering means 40 is located in the image processing apparatus 2 shown in FIG. 1, which constitutes the first embodiment. In the same manner, the signal value altering means 40 may be located in the image processing apparatuses shown in FIGS. 6, 9, 11, 12, and 14, which constitute the second to sixth embodiments. In the second, fourth, and sixth embodiments shown in FIGS. 6, 11, and 14, the signal value altering means 40 may be located between the marker signal appending means 23' and the processing means 25'.

Figure 16A:
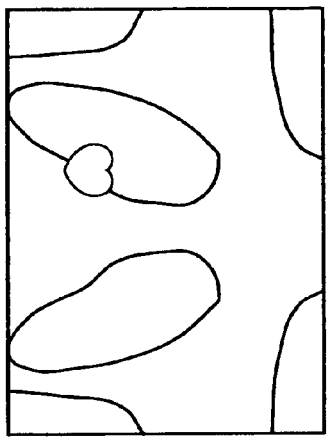
FIG. 16A is an explanatory view showing a different example of a radiation image reproduced from an image signal.
Figure 16B:
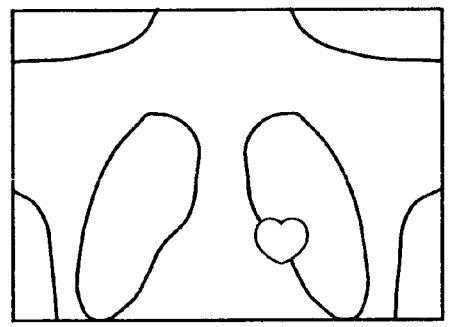
FIG. 16B is an explanatory view showing a radiation image obtained by rotating and reversing the radiation image shown in FIG. 16A.

In the embodiments described above, the marker signal M is appended to the image signal S0 at the time at which the image signal S0 is reversed. By way of example, in cases where a radiation image of a patient having a comparatively large body is to be recorded on the stimulable phosphor sheet 17, the image recording operation is often performed, wherein the stimulable phosphor sheet 17 is rotated by an angle of 90 degrees, and a radiation image of a portion of the patient extending over a range in the horizontal direction, which range is broader than the range in the vertical direction, is recorded. In cases where the image recording operation is performed in this manner, in the image read-out means 12, the stimulable phosphor sheet 17 is conveyed along its longitudinal direction, and the radiation image stored on the stimulable phosphor sheet 17 is read out. Therefore, when a visible image is reproduced directly from the thus detected image signal S0, a radiation image as shown in FIG. 16A is obtained. At this time, the ID information T contains the information representing that the stimulable phosphor sheet 17 was orientated with its longitudinal side extending horizontally in the image recording operation. Therefore, in the direction transforming means 24 or 24', the direction transforming process is performed on the image signal S0, in which the radiation image represented by the image signal S0 is rotated counter-clockwise by an angle of 90 degrees and is thereafter reversed. From the direction transforming process, the direction-transformed image signal S1 is obtained, from which an image shown in FIG. 16B can be reproduced.

Figure 17A:
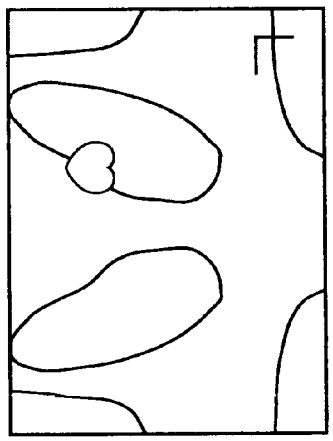
FIG. 17A is an explanatory view showing a different example of a radiation image reproduced from an image signal, which has been obtained by performing an image recording operation by use of a marker.
Figure 17B:
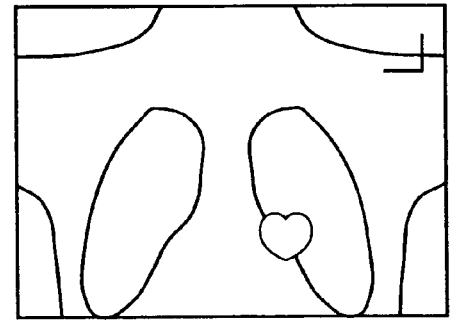
FIG. 17B is an explanatory view showing a radiation image obtained by rotating and reversing the radiation image shown in FIG. 17A.

In such an image recording operation, an L-shaped marker may be attached to a position on the stimulable phosphor sheet 17, which position corresponds to a position in the vicinity of the left shoulder of the patient. In such cases, as illustrated in FIG. 17A, an L-shaped marker pattern is embedded in the image represented by the image signal S0. Also, as illustrated in FIG. 17B, in the image represented by the direction-transformed image signal S1, which is obtained from the process performed by the direction transforming means 24 or 24' on the image signal S0 for rotating the image counter-clockwise by an angle of 90 degrees and then reversing the right and left sides of the image, the marker pattern having the rotated and reversed L-shape is embedded. Therefore, the medical doctor, who sees the image shown in FIG. 17B, can confirm that the marker pattern has been rotated and reversed, and can thereby recognize that the entire image has been rotated and reversed.

Figure 18:
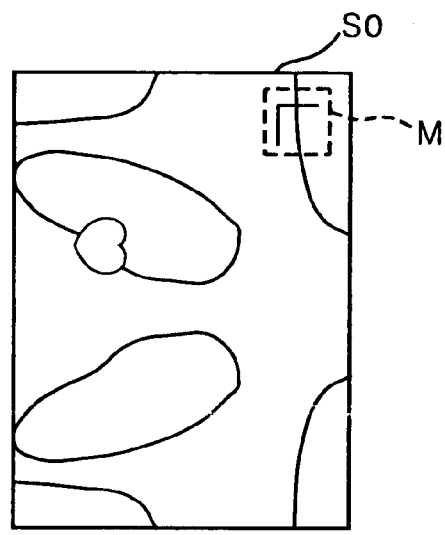
FIG. 18 is an explanatory view showing an example of how a marker signal is appended to an image signal.
Figure 19:
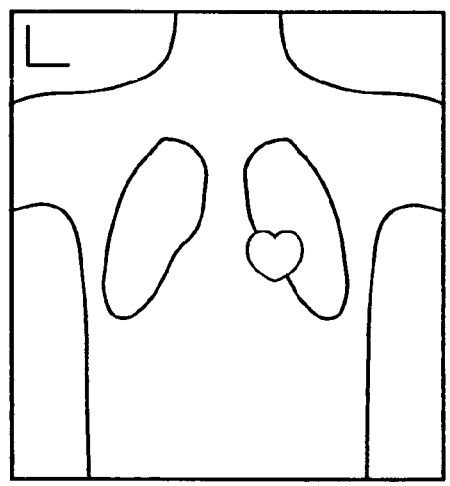
FIG. 19 is an explanatory view showing a radiation image obtained when a marker signal is directly appended to an image signal, which has been obtained from a reversing process.

Accordingly, in the determination means 22 in the first, third, and fifth embodiments, which are shown in FIGS. 1, 9, and 12, the direction and the appending position of the marker signal M are determined such that, when the image signal S0 is rotated and reversed by the direction transforming means 24, the image as shown in FIG. 17B can be obtained, in which the marker pattern having the rotated and reversed L-shape is embedded. Also, the marker signal appending means 23 appends the marker signal M to the image signal S0 in accordance with the thus determined direction and the thus determined appending position of the marker signal M. Specifically, as illustrated in FIG. 18, the marker signal M is appended to the image signal S0 such that the L-shaped marker pattern, which is represented by the marker signal M, is rotated clockwise by an angle of 90 degrees and embedded in the thus rotated, non-reversed form at a position in the vicinity of the image pattern of the left shoulder of the patient in the image represented by the image signal S0. In this manner, the marker signal M is appended to the image signal S0. Therefore, as illustrated in FIG. 17B, when a visible image is reproduced from the direction-transformed image signal S1, which has been obtained by rotating and reversing the image represented by the image signal S0 having been appended with the marker signal M, the reproduced image can be obtained in the same manner as that in the cases where the image recording operation was performed by use of a marker.

In the marker signal altering means 30 in the second, fourth, and sixth embodiments, which are shown in FIGS. 6, 11, and 14, the direction of the marker signal M is altered and the direction-altered marker signal M' is obtained such that, when the image signal S0 is rotated and reversed by the direction transforming means 24', the image as shown in FIG. 17B can be obtained, in which the marker pattern having the rotated and reversed L-shape is embedded. In this manner, the direction-altered marker signal M' is appended to the image signal S10. Therefore, as illustrated in FIG. 17B, when a visible image is reproduced from the image signal S11 having been appended with the direction-altered marker signal M', the reproduced image can be obtained in the same manner as that in the cases where the image recording operation was performed by use of a marker.

In the first, third, and fifth embodiments, which are shown in FIGS. 1, 9, and 12, after the marker signal M has been appended to the image signal S0, the direction transforming process is performed. Alternatively, the direction transforming process may be performed on the image signal S0 before being appended with the marker signal M, and the direction-transformed image signal S1 may thereby be obtained. Thereafter, in accordance with the direction and the appending position of the marker signal M, which have been determined in accordance with the information giving specifics about the image recording technique, the marker signal M may be appended to the direction-transformed image signal S1.

What is claimed is:

1. An image processing method, in which a direction transforming process is performed on an image signal representing an image and in accordance with information giving specifics about an image recording technique, and in which a marker pattern represented by a marker signal is appended to the image represented by the image signal, the method comprising the steps of:

determining a direction of the marker signal and an appending position of the marker signal in accordance with the information giving specifics about the image recording technique, and appending the marker signal to the image signal in accordance with the thus determined direction of the marker signal and the thus determined appending position of the marker signal, wherein a size of the marker signal is altered in accordance with a size of the image, which is represented by the image signal, and/or a read-out density, with which the image signal was obtained, wherein, in cases where a signal value of the marker signal and signal values of image signal components of the image signal, which image signal components correspond to the position in the vicinity of the appending position of the marker signal, approximately coincide with each other, the signal value of the marker signal and/or the signal values of the image signal components of the image signal, which image signal components correspond to the position in the vicinity of the appending position of the marker signal, are altered.

2. An image processing method, in which a direction transforming process is performed on an image signal representing an image and in accordance with information giving specifics about an image recording technique, and in which a marker pattern represented by a marker signal is appended to the image represented by the image signal, the method comprising the steps of:

performing the direction transforming process on the image signal, displaying an image, which is represented by the image signal having been subjected to the direction transforming process, together with a pointer, which indicates an arbitrary position on the image, on displaying means, altering the direction of the marker signal in accordance with the information giving specifics about the image recording technique, altering the shape of the pointer to a shape of a marker pattern, which is represented by the altered marker signal, altering the position of the marker pattern on the image in accordance with a pointer position altering instruction, and appending the marker signal to the image signal in accordance with a marker pattern appending instruction given at a desired position on the image displayed on the displaying means, wherein a size of the marker signal is altered in accordance with a size of the image, which is represented by the image signal, and/or a read-out density, with which the image signal was obtained, wherein, in cases where a signal value of the marker signal and signal values of image signal components of the image signal, which image signal components correspond to the position in the vicinity of the appending position of the marker signal, approximately coincide with each other, the signal value of the marker signal and/or the signal values of the image signal components of the image signal, which image signal components correspond to the position in the vicinity of the appending position of the marker signal, are altered.

3. An image processing apparatus, which is provided with direction transforming means for performing a direction transforming process on an image signal representing an image and in accordance with information giving specifics about an image recording technique, and in which a marker pattern represented by a marker signal is appended to the image represented by the image signal, the apparatus comprising:

determination means for determining a direction of the marker signal and an appending position of the marker signal in accordance with the information giving specifics about the image recording technique, marker signal appending means for appending the marker signal to the image signal in accordance with the thus determined direction of the marker signal and the thus determined appending position of the marker signal, and signal value altering means for operating such that, in cases where a signal value of the marker signal and signal values of image signal components of the image signal, which image signal components correspond to the position in the vicinity of the appending position of the marker signal, approximately coincide with each other, the signal value altering means alters the signal value of the marker signal and/or the signal values of the image signal components of the image signal, which image signal components correspond to the position in the vicinity of the appending position of the marker signal, wherein the determination means alters a size of the marker signal in accordance with a size of the image, which is represented by the image signal, and/or a read-out density, with which the image signal was obtained.

4. An image processing apparatus, which is provided with direction transforming means for performing a direction transforming process on an image signal representing an image and in accordance with information giving specifics about an image recording technique, the apparatus comprising:

displaying means for displaying an image, which is represented by the image signal having been subjected to the direction transforming process performed by the direction transforming means, together with a pointer, which indicates an arbitrary position on the image, marker signal altering means for altering a direction of a marker signal, which represents a marker pattern to be appended to the image represented by the image signal, in accordance with the information giving specifics about the image recording technique, pointer altering means for altering the shape of the pointer to a shape of a marker pattern, which is represented by the altered marker signal, position altering means for altering the position of the marker pattern on the image in accordance with a pointer position altering instruction, marker signal appending means for appending the marker signal to the image signal in accordance with a marker pattern appending instruction given at a desired position on the image displayed on the displaying means, and signal value altering means for operating such that, in cases where a signal value of the marker signal and signal values of image signal components of the image signal, which image signal components correspond to the position in the vicinity of the appending position of the marker signal, approximately coincide with each other, the signal value altering means alters the signal value of the marker signal and/or the signal values of the image signal components of the image signal, which image signal components correspond to the position in the vicinity of the appending position of the marker signal, wherein the determination means alters a size of the marker signal in accordance with a size of the image, which is represented by the image signal, and/or a read-out density, with which the image signal was obtained.

5. A recording medium, on which a program for causing a computer to execute an image processing method has been recorded and from which the computer is capable of reading the program, the image processing method comprising performing a direction transforming process on an image signal representing an image and in accordance with information giving specifics about an image recording technique, and appending a marker pattern represented by a marker signal to the image represented by the image signal, wherein the program comprises the procedures for:

determining a direction of the marker signal and an appending position of the marker signal in accordance with the information giving specifics about the image recording technique, and appending the marker signal to the image signal in accordance with the thus determined direction of the marker signal and the thus determined appending position of the marker signal, wherein the program further comprises the procedure for altering a size of the marker signal in accordance with a size of the image, which is represented by the image signal, and/or a read-out density, with which the image signal was obtained, wherein the program further comprises the procedure for operating such that, in cases where a signal value of the marker signal and signal values of image signal components of the image signal, which image signal components correspond to the position in the vicinity of the appending position of the marker signal, approximately coincide with each other, the signal value of the marker signal and/or the signal values of the image signal components of the image signal, which image signal components correspond to the position in the vicinity of the appending position of the marker signal, are altered.

6. A recording medium, on which a program for causing a computer to execute an image processing method has been recorded and from which the computer is capable of reading the program, the image processing method comprising performing a direction transforming process on an image signal representing an image and in accordance with information giving specifics about an image recording technique, and appending a marker pattern represented by a marker signal to the image represented by the image signal, wherein the program comprises the procedures for:

performing the direction transforming process on the image signal, displaying an image, which is represented by the image signal having been subjected to the direction transforming process, together with a pointer, which indicates an arbitrary position on the image, on displaying means, altering the direction of the marker signal in accordance with the information giving specifics about the image recording technique, altering the shape of the pointer to a shape of a marker pattern, which is represented by the altered marker signal, altering the position of the marker pattern on the image in accordance with a pointer position altering instruction, appending the marker signal to the image signal in accordance with a marker pattern appending instruction given at a desired position on the image displayed on the displaying means, operating such that, in cases where a signal value of the marker signal and signal values of image signal components of the image signal, which image signal components correspond to the position in the vicinity of the appending position of the marker signal, approximately coincide with each other, the signal value of the marker signal and/or the signal values of the image signal components of the image signal, which image signal components correspond to the position in the vicinity of the appending position of the marker signal, are altered, and altering a size of the marker signal in accordance with a size of the image, which is represented by the image signal, and/or a read-out density, with which the image signal was obtained.

* * * * *